(12) United States Patent
Cheng et al.

(10) Patent No.: US 10,922,569 B2
(45) Date of Patent: Feb. 16, 2021

(54) METHOD AND APPARATUS FOR DETECTING MODEL RELIABILITY

(71) Applicant: BEIJING BAIDU NETCOM SCIENCE AND TECHNOLOGY CO., LTD., Beijing (CN)

(72) Inventors: Jin Cheng, Beijing (CN); Xun Zou, Beijing (CN); Nan Mao, Beijing (CN); Chengjun Qian, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 42 days.

(21) Appl. No.: 16/509,079

(22) Filed: Jul. 11, 2019

(65) Prior Publication Data

US 2020/0104619 A1 Apr. 2, 2020

(30) Foreign Application Priority Data

Sep. 29, 2018 (CN) .......................... 2018 1 1146141

(51) Int. Cl.
*G06K 9/00* (2006.01)
*G06T 7/13* (2017.01)

(52) U.S. Cl.
CPC ..... *G06K 9/00906* (2013.01); *G06K 9/00281* (2013.01); *G06K 9/00288* (2013.01); *G06T 7/13* (2017.01); *G06T 2207/20081* (2013.01); *G06T 2207/30201* (2013.01)

(58) Field of Classification Search
CPC ........... G06K 9/00906; G06K 9/00281; G06K 9/00288; G06K 9/00228; G06K 9/00222; G06K 9/00287; G06K 9/00248; G06K 9/6407; G06K 9/2009; G06K 9/6423; G06T 7/13; G06T 7/001; G06T 2207/20081; G06T 2207/30201; G06F 17/30249

See application file for complete search history.

(56) References Cited

U.S. PATENT DOCUMENTS

| | | | | |
|---|---|---|---|---|
| 6,996,256 B2* | 2/2006 | Pavlidis | ................. | A61B 5/015 382/118 |
| 7,406,184 B2* | 7/2008 | Wolff | ................. | G06K 9/00228 382/115 |
| 7,570,785 B2* | 8/2009 | Breed | ................. | G06K 9/00228 382/100 |
| 8,374,438 B1* | 2/2013 | Wagner | ................. | G06T 7/001 382/209 |
| 9,087,266 B2* | 7/2015 | Robles-Kelly | ............ | G06T 7/90 |

(Continued)

*Primary Examiner* — Amir Alavi
(74) *Attorney, Agent, or Firm* — Knobbe, Martens, Olson & Bear LLP

(57) ABSTRACT

Embodiments may include a method and apparatus for detecting model reliability. A method may include: acquiring an infrared reflection image and a visible light reflection image of a photographed non-living body; importing the infrared reflection image and the visible light reflection image into a to-be-detected living body detection model, to obtain a detecting result corresponding to the infrared reflection image and a detecting result corresponding to the visible light reflection image; and matching a set concentration level of the infrared reflective coating on the photographed non-living body with the detecting results, and setting a reliability level of the to-be-detected living body detection model based on the matching results.

16 Claims, 5 Drawing Sheets

(56) References Cited

U.S. PATENT DOCUMENTS

| | | | |
|---|---|---|---|
| 9,256,794 B2* | 2/2016 | Braithwaite | G06K 9/2018 |
| 9,619,883 B2* | 4/2017 | Yudovsky | G16H 30/40 |
| 9,875,398 B1* | 1/2018 | Young | G06K 9/00288 |
| 10,452,894 B2* | 10/2019 | Zhang | G06K 9/00255 |
| 10,452,936 B2* | 10/2019 | Mapen | G06T 7/40 |
| 2013/0343601 A1* | 12/2013 | Jia | G06F 3/011 |
| | | | 382/103 |
| 2020/0104619 A1* | 4/2020 | Cheng | G06K 9/2018 |

* cited by examiner

METHOD AND APPARATUS FOR DETECTING MODEL RELIABILITY

This application claims priority to Chinese Patent Application No. 201811146141.9, filed on Sep. 29, 2018, titled "Method and apparatus for detecting model reliability," which is hereby incorporated by reference in its entirety.

TECHNICAL FIELD

Embodiments of the present disclosure relate to the field of computer technology, and particularly to a method and apparatus for detecting model reliability.

BACKGROUND

The face identification technology is a computer application research technology, and belongs to a biometric identification technology. The biological characteristics of organisms may be used not only to distinguish between individual organisms, but also to determine the physical state of individual organisms. For example, the image of an organism may be used to determine whether the organism is a living body, is in a state of fatigue, or the like. The image of an organism may also be used as a condition for determining unlocking of a device, such as a smart device, to prevent attacks from a living body, thereby increasing the security of the device. Skilled persons may obtain a living body detection model for identifying living body attacks based on various types of sample data.

SUMMARY

Embodiments of the present disclosure provide a method and apparatus for detecting model reliability.

In a first aspect, an embodiment of the present disclosure provides a method for detecting model reliability. The method includes: acquiring an infrared reflection image and a visible light reflection image of a photographed non-living body, the photographed non-living body including a human face structure portion, the human face structure portion having an infrared reflective coating of a set concentration level; importing the infrared reflection image and the visible light reflection image into a to-be-detected living body detection model, to obtain a detecting result corresponding to the infrared reflection image and a detecting result corresponding to the visible light reflection image, where the to-be-detected living body detection model is configured to identify whether the photographed object is a living body based on the infrared reflection image and the visible light reflection image; and matching the set concentration level of the infrared reflective coating on the photographed non-living body with the detecting results, and setting a reliability level of the to-be-detected living body detection model based on the matching results.

In some embodiments, the infrared reflective coating at an eyebrow position of the human face structure portion is a graphite coating, the infrared reflective coating at a lip position of the human face structure portion is a ferrosilicon red coating, and the infrared reflective coating at other positions of the human face structure portion is a chrome titanium brown coating.

In some embodiments, the set concentration level includes a low concentration level, an intermediate concentration level and a high concentration level, and the matching the set concentration level of the infrared reflective coating on the photographed non-living body with the detecting results, and setting a reliability level of the to-be-detected living body detection model based on the matching results includes: setting the reliability level of the to-be-detected living body detection model as a first reliability level, in response to the set concentration level being the low concentration level, and the detecting result corresponding to the infrared reflection image and the detecting result corresponding to the visible light reflection image both being a non-living body; otherwise, setting the reliability level of the to-be-detected living body detection model as a first unreliability level.

In some embodiments, the matching the set concentration level of the infrared reflective coating on the photographed non-living body with the detecting results, and setting a reliability level of the to-be-detected living body detection model based on the matching results includes: setting the reliability level of the to-be-detected living body detection model as a second reliability level, in response to the set concentration level being the intermediate concentration level, and the detecting result corresponding to the infrared reflection image and the detecting result corresponding to the visible light reflection image both being the non-living body; otherwise, setting the reliability level of the to-be-detected living body detection model as a second unreliability level, where the second reliability level is higher than the first reliability level, and the second unreliability level is higher than the first unreliability level.

In some embodiments, the matching the set concentration level of the infrared reflective coating on the photographed non-living body with the detecting results, and setting a reliability level of the to-be-detected living body detection model based on the matching results includes: setting the reliability level of the to-be-detected living body detection model as a third reliability level, in response to the set concentration level being the high concentration level, and the detecting result corresponding to the infrared reflection image and the detecting result corresponding to the visible light reflection image both being the non-living body; otherwise, setting the reliability level of the to-be-detected living body detection model as a third unreliability level, where the third reliability level is higher than the second reliability level, and the third unreliability level is higher than the second unreliability level.

In a second aspect, an embodiment of the present disclosure provides an apparatus for detecting model reliability. The apparatus includes: an image acquiring unit, configured to acquire an infrared reflection image and a visible light reflection image of a photographed non-living body, the photographed non-living body including a human face structure portion, the human face structure portion having an infrared reflective coating of a set concentration level; a detecting result acquiring unit, configured to import the infrared reflection image and the visible light reflection image into a to-be-detected living body detection model, to obtain a detecting result corresponding to the infrared reflection image and a detecting result corresponding to the visible light reflection image, the to-be-detected living body detection model configured to identify whether the photographed object is a living body based on the infrared reflection image and the visible light reflection image; and a reliability level setting unit, configured to match the set concentration level of the infrared reflective coating on the photographed non-living body with the detecting results, and set a reliability level of the to-be-detected living body detection model based on the matching results.

In some embodiments, the infrared reflective coating at an eyebrow position of the human face structure portion is a graphite coating, the infrared reflective coating at a lip position of the human face structure portion is a ferrosilicon red coating, and the infrared reflective coating at other positions of the human face structure portion is a chrome titanium brown coating.

In some embodiments, the set concentration level includes a low concentration level, an intermediate concentration level and a high concentration level, and the reliability level setting unit includes: a first reliability level setting unit, configured to set the reliability level of the to-be-detected living body detection model as a first reliability level, in response to the set concentration level being the low concentration level, and the detecting result corresponding to the infrared reflection image and the detecting result corresponding to the visible light reflection image both being a non-living body; otherwise, set the reliability level of the to-be-detected living body detection model as a first unreliability level.

In some embodiments, the reliability level setting unit further includes: a second reliability level setting unit, configured to set the reliability level of the to-be-detected living body detection model as a second reliability level, in response to the set concentration level being the intermediate concentration level, and the detecting result corresponding to the infrared reflection image and the detecting result corresponding to the visible light reflection image both being the non-living body; otherwise, set the reliability level of the to-be-detected living body detection model as a second unreliability level, where the second reliability level is higher than the first reliability level, and the second unreliability level is higher than the first unreliability level.

In some embodiments, the reliability level setting unit further includes: a third reliability level setting unit, configured to set the reliability level of the to-be-detected living body detection model as a third reliability level, in response to the set concentration level being the high concentration level, and the detecting result corresponding to the infrared reflection image and the detecting result corresponding to the visible light reflection image both being the non-living body; otherwise, set the reliability level of the to-be-detected living body detection model as a third unreliability level, where the third reliability level is higher than the second reliability level, and the third unreliability level is higher than the second unreliability level.

In a third aspect, an embodiment of the present disclosure provides a server, including: one or more processors; a memory, configured to store one or more programs thereon, where the one or more programs, when executed by the one or more processors, cause the one or more processors to execute the method for detecting model reliability in the first aspect.

In a fourth aspect, an embodiment of the present disclosure provides a computer readable medium, configured to store a computer program thereon, where the program, when executed by a processor, implements the method for detecting model reliability in the first aspect.

The method and apparatus for detecting model reliability provided in the embodiments of the present disclosure first acquire an infrared reflection image and a visible light reflection image of a photographed non-living body, where the photographed non-living body includes a human face structure portion, and the human face structure portion has an infrared reflective coating of a set concentration level; then import the infrared reflection image and the visible light reflection image into a to-be-detected living body detection model, to obtain a detecting result corresponding to the infrared reflection image and a detecting result corresponding to the visible light reflection image; and finally match the set concentration level of the infrared reflective coating on the photographed non-living body with the detecting results, and set a reliability level of the to-be-detected living body detection model based on the matching results, thus achieving detecting the reliability of the living body detection model.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
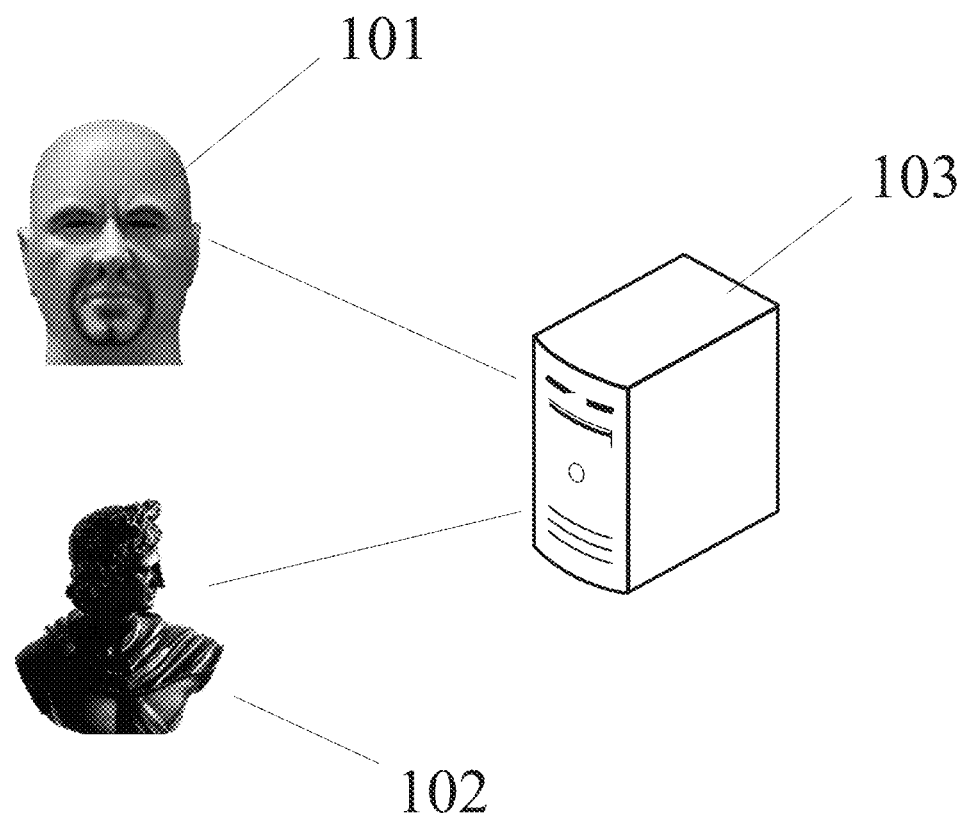
FIG. 1 is an architectural diagram of a system in which an embodiment may be applied.

FIG. 1 shows a system architecture 100 in which a method for detecting model reliability or an apparatus for detecting model reliability of an embodiment may be applied.

As shown in FIG. 1, the system architecture 100 may include a human face mask 101, a human body sculpture 102, and a server 103. The human face portion of the human face mask 101 and the human body sculpture 102 may have an infrared reflective coating. The infrared reflective coating may simulate infrared characteristics of the human face exposed to infrared.

A user may acquire an infrared reflection image and a visible light reflection image of the human face mask 101 and the human body sculpture 102 using various terminal devices, and send the infrared reflection image and the visible light reflection image to the server 103.

The server 103 may be a server storing a living body detection model, e.g., a server detecting reliability of the living body detection model based on the infrared reflection image and the visible light reflection image of the human face mask 101 and the human body sculpture 102. The server may detect the reliability of the living body detection model based on the detecting results of the living body detection model on the infrared reflection image and the visible light reflection image, and information, such as an infrared reflective coating concentration, of the human face mask 101 and the human body sculpture 102.

It should be noted that the method for detecting model reliability provided in the embodiment of the present disclosure is generally executed by the server 103. Accordingly, the apparatus for detecting model reliability is generally provided in the server 103.

It should be noted that the server may be hardware or software. When the server is hardware, the server may be implemented as a distributed server cluster composed of a plurality of servers, or may be implemented as a single server. When the server is software, the server may be implemented as a plurality of software programs or software modules (e.g., software programs or software modules for providing distributed services), or may be implemented as a single software program or software module, which is not specifically limited here.

It should be understood that the numbers of human face masks, human body sculptures, and servers in FIG. 1 are merely illustrative. Any number of human face masks, human body sculptures, and servers may be provided based on actual requirements.

Figure 2:
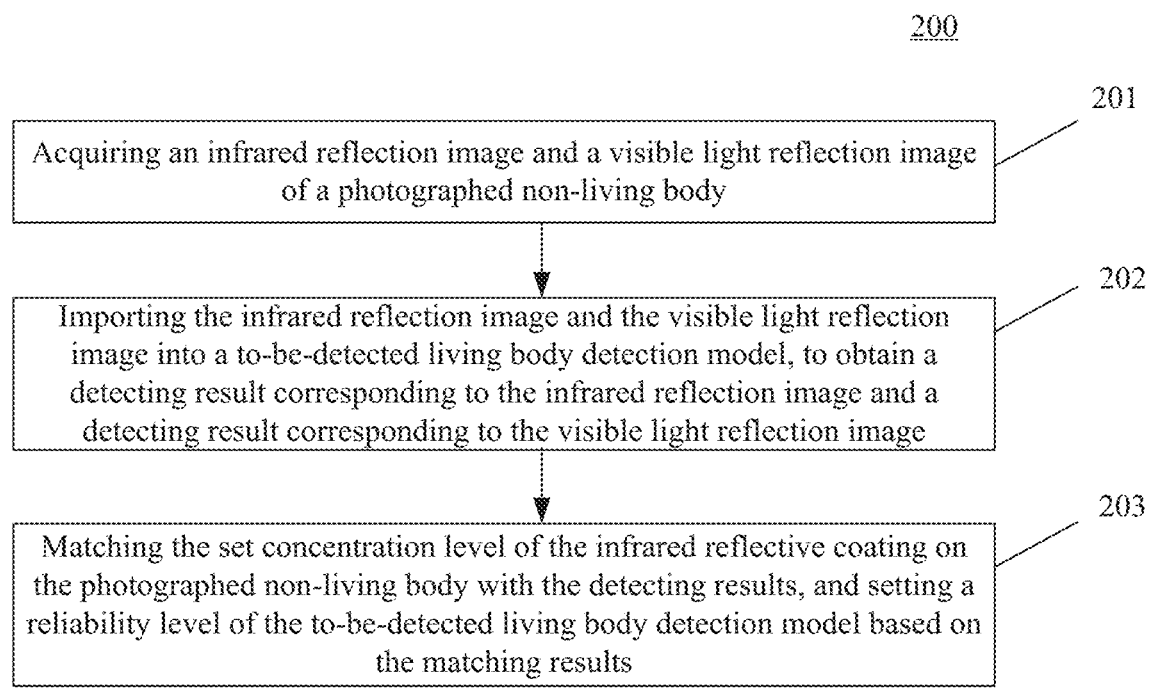
FIG. 2 is a flowchart of an embodiment of a method for detecting model reliability.

Further referring to FIG. 2, a process 200 of an embodiment of a method for detecting model reliability. The method for detecting model reliability includes the following steps.

Step 201: acquiring an infrared reflection image and a visible light reflection image of a photographed non-living body.

In the present embodiment, an executing body (e.g., the server 103 shown in FIG. 1) of the method for detecting model reliability may acquire the infrared reflection image and the visible light reflection image of the photographed non-living body through wired connection or wireless connection.

Sample data when training the living body detection model using an existing method are generally living body sample data or non-living body sample data. The non-living body sample data are generally obviously different from the living body sample data. Therefore, the living body detection model trained using such sample data may generally identify a living body or non-living body with obvious characteristics. When an image of the non-living body encountered by the living body detection model may be used to simulate image characteristics of the living body, the probability that the living body detection model gives an erroneous detection result is high.

Therefore, the executing body of some embodiments of the present disclosure may first acquire the infrared reflection image and the visible light reflection image of the photographed non-living body. The photographed non-living body may include a human face structure portion (for example, the human face mask 101 or the human body sculpture 102). To simulate image features of a real human face, the human face structure portion may have an infrared reflective coating of a set concentration level.

In some alternative implementations of the present embodiment, the infrared reflective coating at an eyebrow position of the human face structure portion is a graphite coating, the infrared reflective coating at a lip position of the human face structure portion is a ferrosilicon red coating, and the infrared reflective coating at other positions of the human face structure portion is a chrome titanium brown coating.

In order to detect the effect of a to-be-detected living body detection model in preventing a living body from attacks when exposing to visible light and infrared light, a human face structure of the photographed non-living body of some embodiments of the present disclosure pertinently is used to simulate human face features in a plurality of portions. Graphite has a characteristic of reflecting infrared, and is black in itself. Therefore, the infrared reflective coating at the eyebrow position of the human face structure portion may be the graphite coating. Ferrosilicon red also has a characteristic of reflecting infrared, and its color is similar to the color of lips. The infrared reflective coating at the lip position of the human face structure portion may be the ferrosilicon red coating. Thus, the human face mask 101 or the human body sculpture 102 may be used to simulate the real human face under conditions of exposure to visible light and infrared light.

Step 202: importing the infrared reflection image and the visible light reflection image into a to-be-detected living body detection model, to obtain a detecting result corresponding to the infrared reflection image and a detecting result corresponding to the visible light reflection image.

After obtaining the infrared reflection image and the visible light reflection image, the executing body may import the infrared reflection image and the visible light reflection image into the to-be-detected living body detection model. The to-be-detected living body detection model may be stored locally in the executing body, or stored in other device. When the to-be-detected living body detection model is stored in the other device, the executing body may establish data communication with the to-be-detected living body detection model through a data interface with the other device. The to-be-detected living body detection model may be configured to identify whether the photographed object is a living body based on the infrared reflection image and the visible light reflection image.

Step 203: matching the set concentration level of the infrared reflective coating on the photographed non-living body with the detecting results, and setting a reliability level of the to-be-detected living body detection model based on the matching results.

In general, the to-be-detected living body detection model has a certain precision of identifying a living body or non-living body. The executing body may match the set concentration level of the infrared reflective coating on the photographed non-living body with the detecting results, and determine a reliability level of the to-be-detected living body detection model based on the matching results.

In some alternative implementations of the present embodiment, the set concentration level may include a low concentration level, an intermediate concentration level and a high concentration level. The matching the set concentration level of the infrared reflective coating on the photographed non-living body with the detecting results, and setting a reliability level of the to-be-detected living body detection model based on the matching results may include: setting the reliability level of the to-be-detected living body detection model as a first reliability level, in response to that the set concentration level is the low concentration level, and the detecting result corresponding to the infrared reflection image and the detecting result corresponding to the visible light reflection image both are a non-living body, otherwise, setting the reliability level of the to-be-detected living body detection model as a first unreliability level.

For the sake of qualitatively description describe of the reliability of the to-be-detected living body detection model, the set concentration level of some embodiments of the present disclosure may include the low concentration level, the intermediate concentration level and the high concentration level. When the graphite coating, the ferrosilicon red, and the chrome antimony titanium brown buff rutile coating on the human face mask 101 or the human body sculpture 102 are the low concentration levels, the human face mask 101 or the human body sculpture 102 may be caused to imitate the real human face to a certain extent, i.e., the to-be-detected living body detection model may obtain slightly fewer image features than the image features of the real human face. If in this case, the detecting result of the infrared reflection image and the detecting result of the visible light reflection image of the to-be-detected living body detection model on the human face mask 101 or the human body sculpture 102 are both a non-living body, then it indicates that the to-be-detected living body detection model may relatively accurately identify a non-living body having a certain ability to imitate the real human face. In this case, the reliability level of the to-be-detected living body detection model may be set as the first reliability level. When the detecting result of the infrared reflection image of the to-be-detected living body detection model on the human face mask 101 or the human body sculpture 102 is a living body, or the detecting result of the visible light reflection image of the to-be-detected living body detection model on the human face mask 101 or the human body sculpture 102 is a living body, or the detecting result of the infrared reflection image and the detecting result of the visible light reflection image of the to-be-detected living body detection model on the human face mask 101 or the human body sculpture 102 are both a living body, it indicates that the to-be-detected living body detection model cannot accurately identify the non-living body having a certain ability to imitate the real human face. In this case, the reliability level of the to-be-detected living body detection model may be set as the first unreliability level.

In some alternative implementations of the present embodiment, the matching the set concentration level of the infrared reflective coating on the photographed non-living body with the detecting results, and setting a reliability level of the to-be-detected living body detection model based on the matching results may include: setting the reliability level of the to-be-detected living body detection model as a second reliability level, in response to that the set concentration level is the intermediate concentration level, and the detecting result corresponding to the infrared reflection image and the detecting result corresponding to the visible light reflection image both are the non-living body; otherwise, setting the reliability level of the to-be-detected living body detection model as a second unreliability level.

When the graphite coating, the ferrosilicon red, and the chrome titanium brown coating on the human face mask 101 or the human body sculpture 102 are the intermediate concentration levels, the human face mask 101 or the human body sculpture 102 may be caused to be close to the image features of the real human face as much as possible. That is, the to-be-detected living body detection model may be close to the image features of the real human face. If in this case, the detecting result of the infrared reflection image and the detecting result of the visible light reflection image of the to-be-detected living body detection model on the human face mask 101 or the human body sculpture 102 are both a non-living body, then it indicates that the to-be-detected living body detection model may relatively accurately identify a non-living body having a very strong ability to imitate the real human face. In this case, the reliability level of the to-be-detected living body detection model may be set as the second reliability level. When the detecting result of the infrared reflection image of the to-be-detected living body detection model on the human face mask 101 or the human body sculpture 102 is a living body, or the detecting result of the visible light reflection image of the to-be-detected living body detection model on the human face mask 101 or the human body sculpture 102 is a living body, or the detecting result of the infrared reflection image and the detecting result of the visible light reflection image of the to-be-detected living body detection model on the human face mask 101 or the human body sculpture 102 are both a living body, it indicates that the to-be-detected living body detection model cannot accurately identify the non-living body having a very strong ability to imitate the real human face. In this case, the reliability level of the to-be-detected living body detection model may be set as the second unreliability level. It should be noted that the higher is the concentration of the infrared reflective coating, the more may the real human face be really and comprehensively simulated. Accordingly, when a to-be-detected living body detection model may accurately identify the infrared reflection image and the visible light reflection image of the human face mask 101 or the human body sculpture 102 of the intermediate concentration level, generally the to-be-detected living body detection model may also accurately identify the infrared reflection image and the visible light reflection image of the human face mask 101 or the human body sculpture 102 of the low concentration level. That is, the second reliability level has higher reliability than the first reliability level. Accordingly, when a to-be-detected living body detection model cannot accurately identify the infrared reflection image and the visible light reflection image of the human face mask 101 or the human body sculpture 102 of the low concentration level, the to-be-detected living body detection model is very likely not to be capable of accurately identifying the infrared reflection image and the visible light reflection image of the human face mask 101 or the human body sculpture 102 of the intermediate concentration level. That is, the second unreliability level has higher reliability than the first unreliability level.

In some alternative implementations of the present embodiment, the matching the set concentration level of the infrared reflective coating on the photographed non-living body with the detecting results, and setting a reliability level of the to-be-detected living body detection model based on the matching results may include: setting the reliability level of the to-be-detected living body detection model as a third reliability level, in response to that the set concentration level is the high concentration level, and the detecting result corresponding to the infrared reflection image and the detecting result corresponding to the visible light reflection image both are a non-living body; otherwise, setting the reliability level of the to-be-detected living body detection model as a third unreliability level.

When the graphite coating, the ferrosilicon red, and the chrome antimony titanium buff rutile brown coating on the human face mask 101 or the human body sculpture 102 are the high concentration levels, the infrared reflection image and the visible light reflection image of the human face mask 101 or the human body sculpture 102 may be caused to have more obvious image features than the image features of the real human face to a certain extent, i.e., the to-be-detected living body detection model may obtain more image features than the image features of the real human face. If in this case, the detecting result of the infrared reflection image and the detecting result of the visible light reflection image of the to-be-detected living body detection model on the human face mask 101 or the human body sculpture 102 are both the non-living body, then it indicates that no matter how the real human face is simulated, the to-be-detected living body detection model may very accurately identify the non-living body. In this case, the reliability level of the to-be-detected living body detection model may be set as the third reliability level. When the detecting result of the infrared reflection image of the to-be-detected living body detection model on the human face mask 101 or the human body sculpture 102 is a living body, or the detecting result of the visible light reflection image of the to-be-detected living body detection model on the human face mask 101 or the human body sculpture 102 is a living body, or the detecting result of the infrared reflection image and the detecting result of the visible light reflection image of the to-be-detected living body detection model on the human face mask 101 or the human body sculpture 102 are both a living body, it indicates that the to-be-detected living body detection model cannot accurately identify the non-living body. In this case, the reliability level of the to-be-detected living body detection model may be set as the third unreliability level. When a to-be-detected living body detection model may accurately identify the infrared reflection image and the visible light reflection image of the human face mask 101 or the human body sculpture 102 of the high concentration level, generally the to-be-detected living body detection model may also accurately identify the infrared reflection image and the visible light reflection image of the human face mask 101 or the human body sculpture 102 of the intermediate concentration level and the low concentration level. That is, the third reliability level has higher reliability than the second reliability level and the first reliability level. Accordingly, when a to-be-detected living body detection model cannot accurately identify the infrared reflection image and the visible light reflection image of the human face mask 101 or the human body sculpture 102 of the low concentration level and the intermediate concentration level, the to-be-detected living body detection model is very likely not to be capable of accurately identifying the infrared reflection image and the visible light reflection image of the human face mask 101 or the human body sculpture 102 of the high concentration level. That is, the third unreliability level has higher reliability than the second unreliability level and the first unreliability level. In general, classification of the reliability of the to-be-detected living body detection model in some embodiments of the present disclosure is: third reliability level>second reliability level>first reliability level>third unreliability level>second unreliability level>first unreliability level.

When it is necessary to determine accurate reliability of a to-be-detected living body detection model, the to-be-detected living body detection model may be tested for the infrared reflective coating of different concentration levels. If the infrared reflective coating may accurately identify the infrared reflection image and the visible light reflection image of the low concentration level, but cannot accurately identify the infrared reflection image and the visible light reflection image of the intermediate concentration level, then the final reliability level of the to-be-detected living body detection model may be set as the first reliability level. Similarly, the to-be-detected living body detection model may also be set as other final reliability level.

Figure 3:
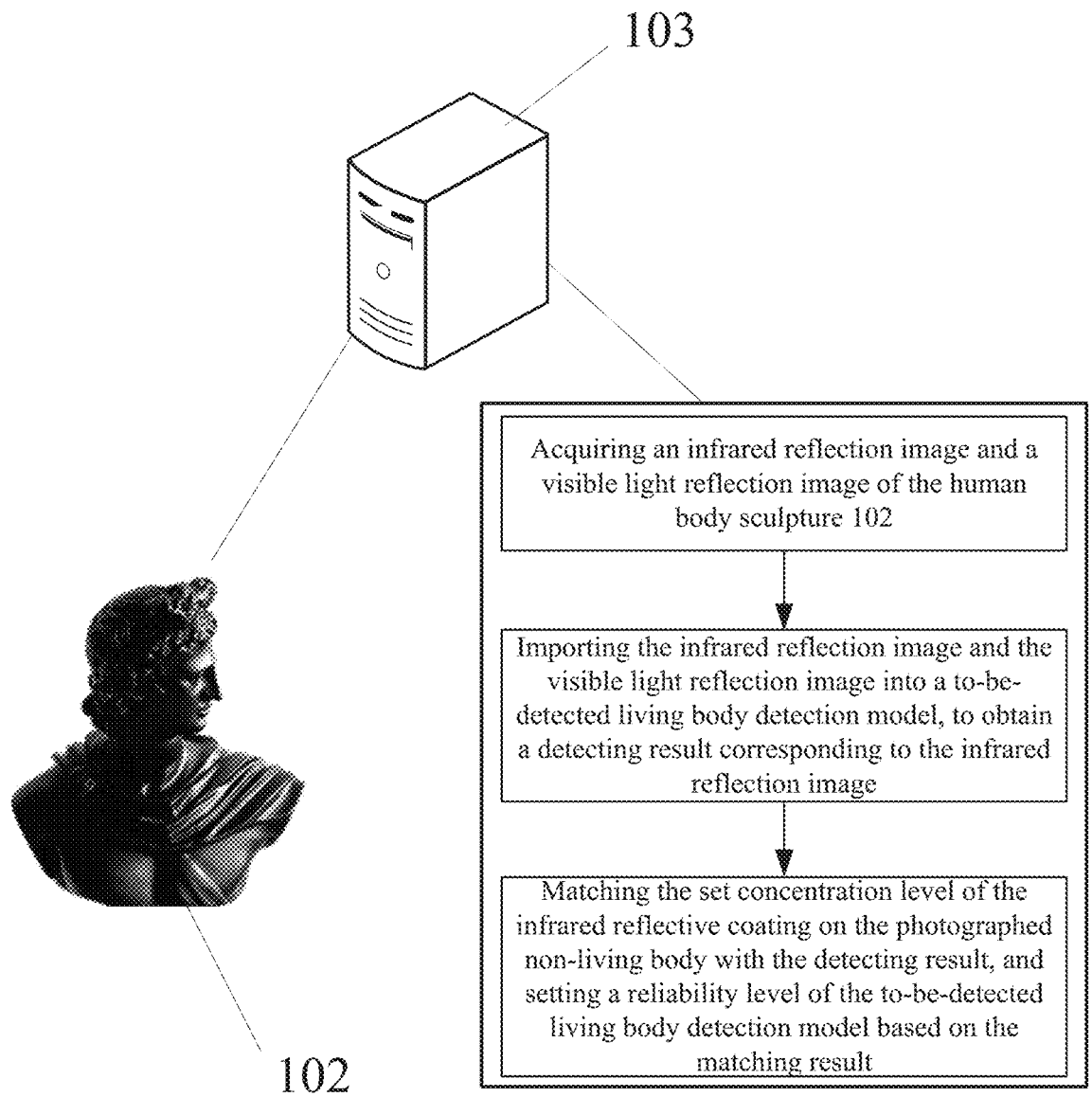
FIG. 3 is a schematic diagram of an application scenario of the method for detecting model reliability according to an embodiment.

Further referring to FIG. 3, FIG. 3 is a schematic diagram of an application scenario of the method for detecting model reliability according to the present embodiment. In the application scenario of FIG. 3, after acquiring an infrared reflection image and a visible light reflection image of the human body sculpture 102, the server 103 imports the infrared reflection image and the visible light reflection image of the human body sculpture 102 into a to-be-detected living body detection model, to obtain a detecting result corresponding to the infrared reflection image and a detecting result corresponding to the visible light reflection image. Finally, the set concentration level of the infrared reflective coating on the photographed non-living body is matched with the detecting results, and a reliability level of the to-be-detected living body detection model is set based on the matching results.

The method provided in the above embodiments of the present disclosure first acquires an infrared reflection image and a visible light reflection image of a photographed non-living body, where the photographed non-living body includes a human face structure portion, and the human face structure portion has an infrared reflective coating of a set concentration level; then imports the infrared reflection image and the visible light reflection image into a to-be-detected living body detection model, to obtain a detecting result corresponding to the infrared reflection image and a detecting result corresponding to the visible light reflection image; and finally matches the set concentration level of the infrared reflective coating on the photographed non-living body with the detecting results, and sets a reliability level of the to-be-detected living body detection model based on the matching results, thus achieving detecting the reliability of the living body detection model.

Figure 4:
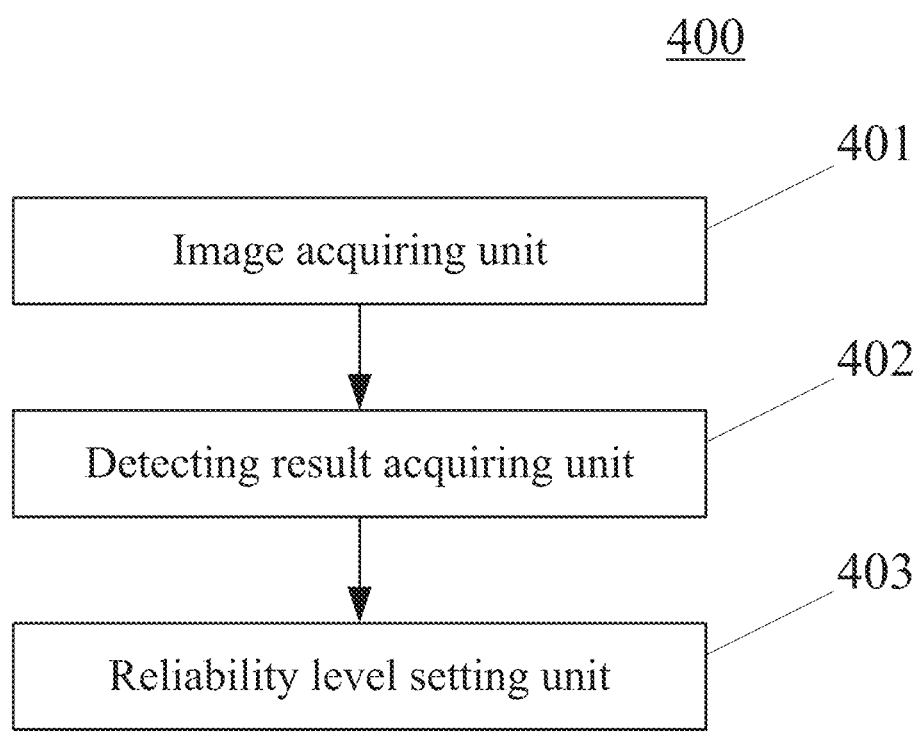
FIG. 4 is a schematic structural diagram of an embodiment of an apparatus for detecting model reliability.

Further referring to FIG. 4, as an implementation of the method shown in the above figures, the present disclosure provides an embodiment of an apparatus for detecting model reliability. The embodiment of the apparatus corresponds to the embodiment of the method shown in FIG. 2, and the apparatus may be specifically applied to various electronic devices.

As shown in FIG. 4, the apparatus 400 for detecting model reliability of the present embodiment may include: an image acquiring unit 401, a detecting result acquiring unit 402, and a reliability level setting unit 403. The image acquiring unit 401 is configured to acquire an infrared reflection image and a visible light reflection image of a photographed non-living body, where the photographed non-living body includes a human face structure portion, the human face structure portion has an infrared reflective coating of a set concentration level; the detecting result acquiring unit 402 is configured to import the infrared reflection image and the visible light reflection image into a to-be-detected living body detection model, to obtain a detecting result corresponding to the infrared reflection image and a detecting result corresponding to the visible light reflection image, where the to-be-detected living body detection model is configured to identify whether the photographed object is a living body based on the infrared reflection image and the visible light reflection image; and the reliability level setting unit 403 is configured to match the set concentration level of the infrared reflective coating on the photographed non-living body with the detecting results, and set a reliability level of the to-be-detected living body detection model based on the matching results.

In some alternative implementations of the present embodiment, the infrared reflective coating at an eyebrow position of the human face structure portion is a graphite coating, the infrared reflective coating at a lip position of the human face structure portion is a ferrosilicon red coating, and the infrared reflective coating at other positions of the human face structure portion is a chrome titanium brown coating.

In some alternative implementations of the present embodiment, the set concentration level includes a low concentration level, an intermediate concentration level and a high concentration level. The reliability level setting unit 403 may include: a first reliability level setting unit (not shown in the figure), configured to set the reliability level of the to-be-detected living body detection model as a first reliability level, in response to the set concentration level being the low concentration level, and the detecting result corresponding to the infrared reflection image and the detecting result corresponding to the visible light reflection image both being a non-living body; otherwise, set the reliability level of the to-be-detected living body detection model as a first unreliability level.

In some alternative implementations of the present embodiment, the reliability level setting unit 403 may further include: a second reliability level setting unit (not shown in the figure), configured to set the reliability level of the to-be-detected living body detection model as a second reliability level, in response to the set concentration level being the intermediate concentration level, and the detecting result corresponding to the infrared reflection image and the detecting result corresponding to the visible light reflection image both being the non-living body; otherwise, set the reliability level of the to-be-detected living body detection model as a second unreliability level, where the second reliability level is higher than the first reliability level, and the second unreliability level is higher than the first unreliability level.

In some alternative implementations of the present embodiment, the reliability level setting unit 403 may further include: a third reliability level setting unit (not shown in the figure), configured to set the reliability level of the to-be-detected living body detection model as a third reliability level, in response to the set concentration level being the high concentration level, and the detecting result corresponding to the infrared reflection image and the detecting result corresponding to the visible light reflection image both being the non-living body; otherwise, set the reliability level of the to-be-detected living body detection model as a third unreliability level, where the third reliability level is higher than the second reliability level, and the third unreliability level is higher than the second unreliability level.

The present embodiment further provides a server, including: one or more processors; and a memory, configured to store one or more programs thereon, where the one or more programs, when executed by the one or more processors, cause the one or more processors to execute the above method for detecting model reliability.

The present embodiment further provides a computer readable medium, storing a computer program thereon, where the program, when executed by a processor, implements the above method for detecting model reliability.

Figure 5:
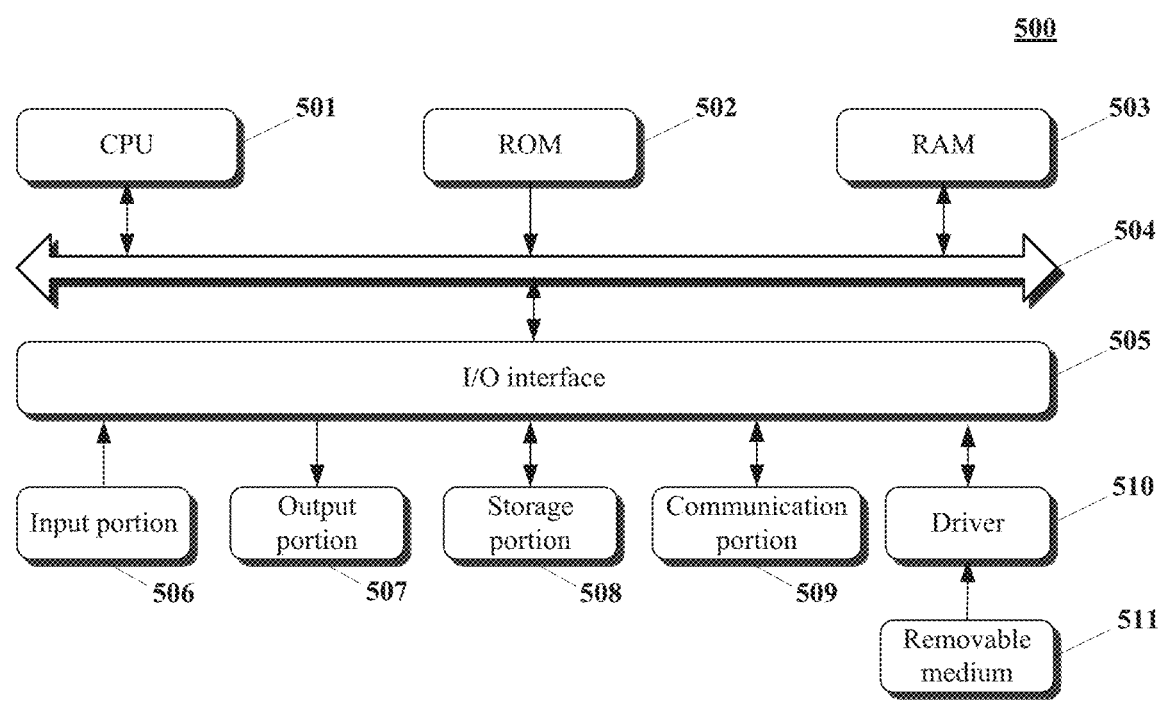
FIG. 5 is a schematic structural diagram of a computer system adapted to implement a server of some embodiments.

Referring to FIG. 5 below, a schematic structural diagram of a computer system 500 adapted to implement a server (e.g., the server 103 in FIG. 1) of some embodiments. The server shown in FIG. 5 is merely an example, and should not limit the functions and scope of use of the embodiments of the present disclosure.

As shown in FIG. 5, the computer system 500 includes a central processing unit (CPU) 501, which may execute various appropriate actions and processes in accordance with a program stored in a read only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse, or the like; an output portion 507 including a cathode ray tube (CRT), a liquid crystal display device (LCD), a speaker, or the like; a storage portion 508 including a hard disk, or the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, so that a computer program read therefrom is installed on the storage portion 508 as needed.

In particular, according to embodiments of the present disclosure, the process described above with reference to the flow chart may be implemented in a computer software program. For example, an embodiment of the present disclosure includes a computer program product, which includes a computer program carried in a computer readable medium. The computer program includes program codes for executing the method as shown in the flow chart. In such an embodiment, the computer program may be downloaded and installed from a network via the communication portion 509, and/or may be installed from the removable medium 511. The computer program, when executed by the central processing unit (CPU) 501, implements the above functions as defined by the method of some embodiments of the present disclosure.

It should be noted that the computer readable medium may be a computer readable signal medium or a computer readable storage medium or any combination thereof. An example of the computer readable storage medium may include, but is not limited to: an electric, magnetic, optical, electromagnetic, infrared, or semiconductor system, apparatus, element, or a combination of any of the above. A more specific example of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory or any suitable combination of the above. In some embodiments of the present disclosure, the computer readable storage medium may be any tangible medium containing or storing programs, which may be used by a command execution system, apparatus or element, or incorporated thereto. In some embodiments of the present disclosure, the computer readable signal medium may include a data signal in the base band or propagating as a part of a carrier wave, in which computer readable program codes are carried. The propagating data signal may take various forms, including but not limited to: an electromagnetic signal, an optical signal or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flow charts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as a processor, including an image acquiring unit, a detecting result acquiring unit, and a reliability level setting unit. The names of the units do not constitute a limitation to such units themselves in some cases. For example, the reliability level setting unit may also be described as "a unit for setting reliability of a to-be-detected living body detection model."

In another aspect, the present disclosure further provides a computer readable medium. The computer readable medium may be included in the apparatus in the above described embodiments, or a stand-alone computer readable medium without being assembled into the apparatus. The computer readable medium stores one or more programs. The one or more programs, when executed by the apparatus, cause the apparatus to: acquire an infrared reflection image and a visible light reflection image of a photographed non-living body, the photographed non-living body including a human face structure portion, the human face structure portion having an infrared reflective coating of a set concentration level; import the infrared reflection image and the visible light reflection image into a to-be-detected living body detection model, to obtain a detecting result corresponding to the infrared reflection image and a detecting result corresponding to the visible light reflection image, where the to-be-detected living body detection model is configured to identify whether the photographed object is a living body based on the infrared reflection image and the visible light reflection image; and match the set concentration level of the infrared reflective coating on the photographed non-living body with the detecting results, and set a reliability level of the to-be-detected living body detection model based on the matching results.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for detecting model reliability, comprising:
   acquiring an infrared reflection image and a visible light reflection image of a photographed non-living body, the photographed non-living body comprising a human face structure portion, the human face structure portion having an infrared reflective coating of a set concentration level;
   importing the infrared reflection image and the visible light reflection image into a to-be-detected living body detection model, to obtain a detecting result corresponding to the infrared reflection image and a detecting result corresponding to the visible light reflection image, the to-be-detected living body detection model configured to identify whether the photographed object is a living body based on the infrared reflection image and the visible light reflection image; and
   matching the set concentration level of the infrared reflective coating on the photographed non-living body with the detecting results, and setting a reliability level of the to-be-detected living body detection model based on the matching results.

2. The method according to claim 1, wherein the infrared reflective coating at an eyebrow position of the human face structure portion is a graphite coating, the infrared reflective coating at a lip position of the human face structure portion is a ferrosilicon red coating, and the infrared reflective coating at other positions of the human face structure portion is a chrome titanium brown coating.

3. The method according to claim 1, wherein the set concentration level comprises a low concentration level, an intermediate concentration level and a high concentration level, and
   the matching the set concentration level of the infrared reflective coating on the photographed non-living body with the detecting results, and setting a reliability level of the to-be-detected living body detection model based on the matching results comprises:
   setting the reliability level of the to-be-detected living body detection model as a first reliability level, in response to the set concentration level being the low concentration level, and the detecting result corresponding to the infrared reflection image and the detecting result corresponding to the visible light reflection image both being a non-living body; otherwise, setting the reliability level of the to-be-detected living body detection model as a first unreliability level.

4. The method according to claim 3, wherein the matching the set concentration level of the infrared reflective coating on the photographed non-living body with the detecting results, and setting a reliability level of the to-be-detected living body detection model based on the matching results comprises:
   setting the reliability level of the to-be-detected living body detection model as a second reliability level, in response to the set concentration level being the intermediate concentration level, and the detecting result corresponding to the infrared reflection image and the detecting result corresponding to the visible light reflection image both being the non-living body; otherwise, setting the reliability level of the to-be-detected living body detection model as a second unreliability level, wherein the second reliability level is higher than the first reliability level, and the second unreliability level is higher than the first unreliability level.

5. The method according to claim 4, wherein the matching the set concentration level of the infrared reflective coating on the photographed non-living body with the detecting results, and setting a reliability level of the to-be-detected living body detection model based on the matching results comprises:
setting the reliability level of the to-be-detected living body detection model as a third reliability level, in response to the set concentration level being the high concentration level, and the detecting result corresponding to the infrared reflection image and the detecting result corresponding to the visible light reflection image both being the non-living body; otherwise, setting the reliability level of the to-be-detected living body detection model as a third unreliability level, wherein the third reliability level is higher than the second reliability level, and the third unreliability level is higher than the second unreliability level.

6. A server, comprising:
one or more processors; and
a memory, configured to store one or more programs thereon,
wherein the one or more programs, when executed by the one or more processors, cause the one or more processors to execute the method according to claim 1.

7. An apparatus for detecting model reliability, comprising:
at least one processor; and
a memory storing instructions, which when executed by the at least one processor, cause the at least one processor to perform operations comprising:
acquiring an infrared reflection image and a visible light reflection image of a photographed non-living body, the photographed non-living body comprising a human face structure portion, the human face structure portion having an infrared reflective coating of a set concentration level;
importing the infrared reflection image and the visible light reflection image into a to-be-detected living body detection model, to obtain a detecting result corresponding to the infrared reflection image and a detecting result corresponding to the visible light reflection image, the to-be-detected living body detection model configured to identify whether the photographed object is a living body based on the infrared reflection image and the visible light reflection image; and
matching the set concentration level of the infrared reflective coating on the photographed non-living body with the detecting results, and setting a reliability level of the to-be-detected living body detection model based on the matching results.

8. The apparatus according to claim 7, wherein the infrared reflective coating at an eyebrow position of the human face structure portion is a graphite coating, the infrared reflective coating at a lip position of the human face structure portion is a ferrosilicon red coating, and the infrared reflective coating at other positions of the human face structure portion is a chrome titanium brown coating.

9. The apparatus according to claim 7, wherein the set concentration level comprises a low concentration level, an intermediate concentration level and a high concentration level, and
the matching the set concentration level of the infrared reflective coating on the photographed non-living body with the detecting results, and setting a reliability level of the to-be-detected living body detection model based on the matching results comprises:
setting the reliability level of the to-be-detected living body detection model as a first reliability level, in response to the set concentration level being the low concentration level, and the detecting result corresponding to the infrared reflection image and the detecting result corresponding to the visible light reflection image both being a non-living body, otherwise, setting the reliability level of the to-be-detected living body detection model as a first unreliability level.

10. The apparatus according to claim 9, wherein the matching the set concentration level of the infrared reflective coating on the photographed non-living body with the detecting results, and setting a reliability level of the to-be-detected living body detection model based on the matching results comprises:
setting the reliability level of the to-be-detected living body detection model as a second reliability level, in response to the set concentration level being the intermediate concentration level, and the detecting result corresponding to the infrared reflection image and the detecting result corresponding to the visible light reflection image both being the non-living body; otherwise, setting the reliability level of the to-be-detected living body detection model as a second unreliability level, wherein the second reliability level is higher than the first reliability level, and the second unreliability level is higher than the first unreliability level.

11. The apparatus according to claim 10, wherein the matching the set concentration level of the infrared reflective coating on the photographed non-living body with the detecting results, and setting a reliability level of the to-be-detected living body detection model based on the matching results comprises:
setting the reliability level of the to-be-detected living body detection model as a third reliability level, in response to the set concentration level being the high concentration level, and the detecting result corresponding to the infrared reflection image and the detecting result corresponding to the visible light reflection image both being the non-living body; otherwise, setting the reliability level of the to-be-detected living body detection model as a third unreliability level, wherein the third reliability level is higher than the second reliability level, and the third unreliability level is higher than the second unreliability level.

12. A non-transitory computer readable medium, configured to store a computer program thereon, wherein the program, when executed by a processor, implements operations, the operation comprising:
acquiring an infrared reflection image and a visible light reflection image of a photographed non-living body, the photographed non-living body comprising a human face structure portion, the human face structure portion having an infrared reflective coating of a set concentration level;
importing the infrared reflection image and the visible light reflection image into a to-be-detected living body detection model, to obtain a detecting result corresponding to the infrared reflection image and a detecting result corresponding to the visible light reflection image, the to-be-detected living body detection model configured to identify whether the photographed object is a living body based on the infrared reflection image and the visible light reflection image; and matching the set concentration level of the infrared reflective coating on the photographed non-living body with the detecting results, and setting a reliability level of the to-be-detected living body detection model based on the matching results.

13. The non-transitory computer readable medium according to claim 12, wherein the infrared reflective coating at an eyebrow position of the human face structure portion is a graphite coating, the infrared reflective coating at a lip position of the human face structure portion is a ferrosilicon red coating, and the infrared reflective coating at other positions of the human face structure portion is a chrome titanium brown coating.

14. The non-transitory computer readable medium according to claim 12, wherein the set concentration level comprises a low concentration level, an intermediate concentration level and a high concentration level, and the matching the set concentration level of the infrared reflective coating on the photographed non-living body with the detecting results, and setting a reliability level of the to-be-detected living body detection model based on the matching results comprises:
setting the reliability level of the to-be-detected living body detection model as a first reliability level, in response to the set concentration level being the low concentration level, and the detecting result corresponding to the infrared reflection image and the detecting result corresponding to the visible light reflection image both being a non-living body; otherwise, setting the reliability level of the to-be-detected living body detection model as a first unreliability level.

15. The non-transitory computer readable medium according to claim 14, wherein the matching the set concentration level of the infrared reflective coating on the photographed non-living body with the detecting results, and setting a reliability level of the to-be-detected living body detection model based on the matching results comprises:
setting the reliability level of the to-be-detected living body detection model as a second reliability level, in response to the set concentration level being the intermediate concentration level, and the detecting result corresponding to the infrared reflection image and the detecting result corresponding to the visible light reflection image both being the non-living body; otherwise, setting the reliability level of the to-be-detected living body detection model as a second unreliability level, wherein the second reliability level is higher than the first reliability level, and the second unreliability level is higher than the first unreliability level.

16. The non-transitory computer readable medium according to claim 15, wherein the matching the set concentration level of the infrared reflective coating on the photographed non-living body with the detecting results, and setting a reliability level of the to-be-detected living body detection model based on the matching results comprises:
setting the reliability level of the to-be-detected living body detection model as a third reliability level, in response to the set concentration level being the high concentration level, and the detecting result corresponding to the infrared reflection image and the detecting result corresponding to the visible light reflection image both being the non-living body; otherwise, setting the reliability level of the to-be-detected living body detection model as a third unreliability level, wherein the third reliability level is higher than the second reliability level, and the third unreliability level is higher than the second unreliability level.

* * * * *